Jan. 30, 1945.   W. ROSE   2,368,327
MOLD
Filed April 22, 1942

WITNESS:
Rob-R.Kitchel.

INVENTOR
William Rose
BY
ATTORNEYS.

Patented Jan. 30, 1945

2,368,327

UNITED STATES PATENT OFFICE 2,368,327

MOLD

William Rose, Norristown, Pa., assignor to Taylor Fibre Company, Norristown, Pa., a corporation of Pennsylvania Application April 22, 1942, Serial No. 439,995

5 Claims. (Cl. 18—42)

This invention relates to an improvement in molds and more particularly to molds for use in cooperation with a mandrel in the formation of articles comprising fabric, paper, or the like, impregnated with a synthetic resin or plastic of the thermosetting type.

It has been known heretofore to form various articles, as tubular articles, of various cross-sectional form for various uses, by winding fabric, paper, so-called vulcanized fibre, and the like, impregnated with a thermosetting synthetic resin or plastic, on a mandrel and compressing the wraps while causing the resin to set and the article to become rigid by the application of heat and pressure.

Heat and pressure has heretofore been applied through the medium of heated metallic molds, but such have not been satisfactory for the reasons that they are difficult and expensive to produce and do not produce a perfect product, it being necessary after the molding operation to remove the flash and otherwise trim or finish the molded product.

Now in accordance with this invention a mold is provided the production of which involves a minimum of expense and relatively no skill and which will produce perfect flash-free product without the necessity for any finishing operation.

Having now indicated in a general way the nature and purpose of this invention, I will proceed to a detailed description of a preferred embodiment with reference to the accompanying drawing, in which.

Figures 3, 4:
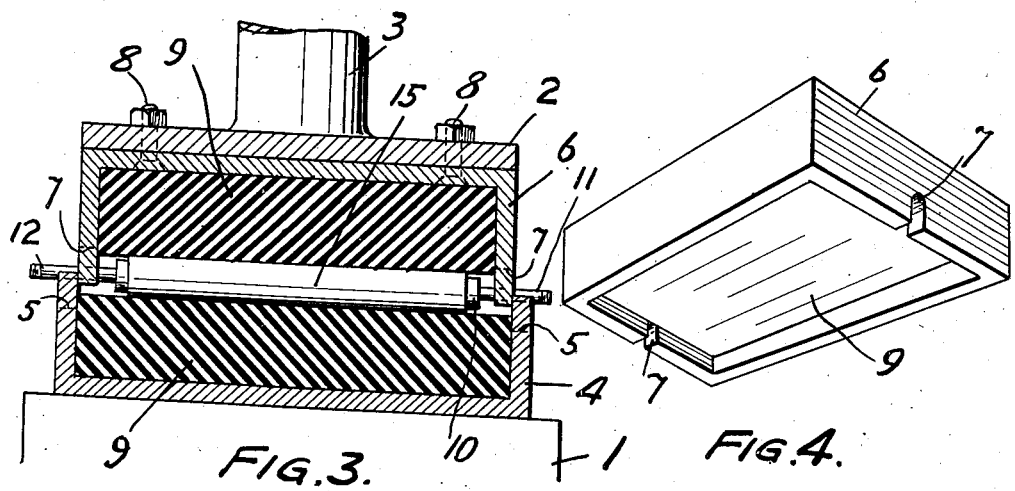
Figure 3 is a sectional view of a mold according to this invention, with a mandrel and wrapping in place before compression.
Figure 4 is a perspective view of the element of the mold shown in Figure 3.
Figures 5, 6:
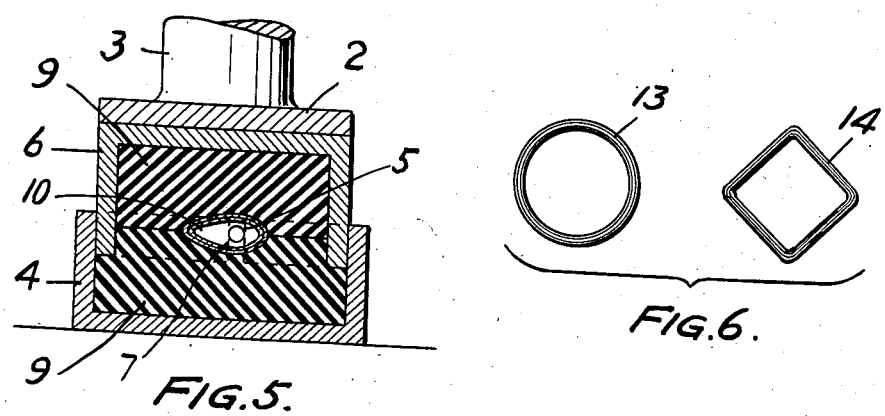
Figure 5 is a sectional view of the subject of Figure 3 under compression, taken at right angles to that of Figure 3.

Figure 6 comprises an end view of tubular articles of various cross-section adapted to be molded by the mold shown in Figures 3 and 4 with use of a mandrel of corresponding cross-sectional shape.

Referring more particularly to Figures 3, 4 and 5, a press bed 1 is positioned below a press platen 2 carried by a ram 3, through which pressure is applied to the platen 2 from any suitable source of power through any convenient well known mechanism.

Mounted on the bed 1 is a box 4 having notches 5, 5 in its opposite end walls. A similar box 6, having notches 7, 7 in its opposite end walls, is secured to the platen 2, as by studs 8, 8. The box 6 is dimensioned to telescope within the box 4 when the press platen 2 is lowered, and the notches 5, 5 and 7, 7 are positioned to align, as shown in Figures 3 and 5.

Within the boxes 4 and 6 are resilient blocks 9, 9, formed, for example, of rubber or synthetic rubber composition having a degree of hardness of the order of, for example, a 60-70 durometer reading. By way of example, without limitation, the blocks 9, 9 may comprise a composition on the following formula:

|  | Parts by weight |
|---|---|
| Smoke sheet | 100 |
| Stearic acid | 4 |
| Pine tar | 3 |
| Phenyl beta naphthylamine | 2 |
| Zinc oxide | 3 |
| Carbon black | 47 |
| Mercaptobenzothiazole | 1 |
| Sulphur | 3 |

For the formation of the blocks the above composition will be suitably molded and cured or vulcanized in any usual manner.

Desirably, the blocks 9, 9, respectively, will be of a thickness not less than twice the thickness of the article to be molded, i. e., the squeeze.

Figure 1:
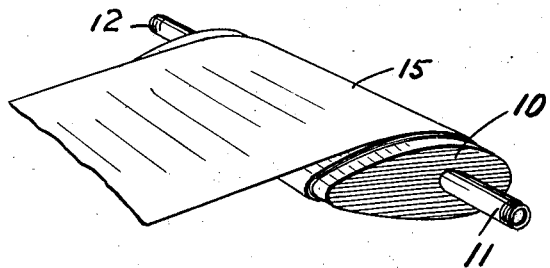
Figure 1 is a perspective view of a mandrel partially wrapped.
Figure 2:
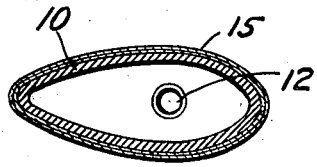
Figure 2 is a cross-sectional view of the mandrel shown in Figure 1, with the wrapping completed.

In use of the mold according to this invention, a hollow mandrel 10, having a heating fluid inlet 11 and outlet 12, of the shape shown in Figure 1, or of other shape, as circular or polygonal, for the formation of tubular articles 13, 14, Figure 6, is wrapped, in any usual manner, with, for example, fabric 15, or the like, impregnated with a thermosetting synthetic resin, to desired thickness. The wrapped mandrel is then placed on the block 9 in the box 4 with the inlet 11 and outlet 12 lying in the notches 5, 5. Inlet 11 is then connected to any suitable source of heating fluid, as steam, and outlet 12 is connected to lead off heating fluid from the mandrel to discharge. Power is applied to ram 3, the blocks 9, 9 are brought together and conform about the wrapping 15, the box 6 telescopes into the box 4 and notches 7, 7 aligning with notches 5, 5 in box 4 to accommodate the inlet 11 and outlet 12. Any desired pressure can be put upon the wrapping 15 through the medium of blocks 9, 9 and the wrapping can be heated as desired by control of the heating fluid circulated through the mandrel 10.

By way of specific example, the wrapping on the mandrel 10 may be subjected to a pressure of say 2000 pounds per square inch while the mandrel is heated to a temperature of say 300° F.

In the mold according to this invention pressure will be applied uniformly in all directions to the wrapping on the mandrel, with the result that flash will be eliminated and on completion of the compression a perfect product requiring no finishing operation will be formed and may be readily removed from the mandrel.

What I claim and desire to protect by Letters Patent is:

1. A mold comprising, in combination, a pair of boxes adapted to telescope one within the other, a solid block presenting a plane surface and formed of a normally non-fluid material having the capacity to flow under pressure positioned in each of said boxes with the plane surfaces of said blocks in opposed relation, means to support one of said boxes and means to move the other box into telescopic relation with said supported box whereby pressure will be exerted through said blocks on an object positioned between their plane surfaces and means for supporting an object in position to be molded between the opposed plane surfaces of said blocks.

2. A mold comprising, in combination, a pair of boxes adapted to telescope one within the other, a solid block presenting a plane surface and formed of a normally non-fluid resilient material having the capacity to flow under pressure positioned in each of said boxes with the plane surfaces of said blocks in opposed relation, means to support one of said boxes and means to move the other box into telescopic relation with said supported box whereby pressure will be exerted through said blocks on an object positioned between their plane surfaces and means for supporting an object in position to be molded between the opposed plane surfaces of said blocks.

3. A mold comprising, in combination, a pair of boxes adapted to telescope one within the other, a solid block presenting a plane surface and formed of a rubber composition having the capacity to flow under pressure positioned in each of said boxes with the plane surfaces of said blocks in opposed relation, means to support one of said boxes and means to move the other box into telescopic relation with said supported box whereby pressure will be exerted through said blocks on an object positioned between their plane surfaces, and means for supporting an object in position to be molded between the opposed plane surfaces of said blocks.

4. A mold comprising, in combination, a pair of boxes adapted to telescope one within the other, a solid block presenting a plane surface and formed of a normally non-fluid material having the capacity to flow under pressure positioned in each of said boxes with the plane surfaces of said blocks in opposed relation, means to support one of said boxes, means to move the other box into telescopic relation with said supported box whereby pressure will be exerted through said blocks and a mandrel positioned between the opposing plane faces of said blocks.

5. A mold comprising, in combination, a pair of boxes adapted to telescope one within the other, aligning notches in opposite walls of said boxes, a solid block presenting a plane surface and formed of a normally non-fluid material having the capacity to flow under pressure positioned in each of said boxes with the plane surfaces of said blocks in opposed relation, means to support one of said boxes, means to move the other box into telescopic relation with said supported box whereby pressure will be exerted through said blocks and a hollow mandrel having an inlet and an outlet extending from its opposite ends positioned between opposite plane faces of said blocks with said inlet and outlet in line with the notches in said boxes.

WILLIAM ROSE.